(12) United States Patent
Sakamoto et al.

(10) Patent No.: US 9,306,675 B2
(45) Date of Patent: Apr. 5, 2016

(54) DIGITAL COHERENT RECEIVER, OPTICAL RECEPTION SYSTEM, AND OPTICAL RECEPTION METHOD

(71) Applicant: FUJITSU LIMITED, Kawasaki-shi, Kanagawa (JP)

(72) Inventors: Yuichirou Sakamoto, Kawasaki (JP); Katsumi Fukumitsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 14/182,359

(22) Filed: Feb. 18, 2014

(65) Prior Publication Data
US 2014/0328602 A1 Nov. 6, 2014

(30) Foreign Application Priority Data

May 2, 2013 (JP) ................................. 2013-097152

(51) Int. Cl.
*H04B 10/61* (2013.01)
(52) U.S. Cl.
CPC ........ *H04B 10/6165* (2013.01); *H04B 10/6161* (2013.01)
(58) Field of Classification Search
USPC .......................................................... 398/208
See application file for complete search history.

(56) References Cited

U.S. PATENT DOCUMENTS

2010/0329698 A1 12/2010 Nakashima
2011/0200339 A1 8/2011 Komaki et al.
2012/0051754 A1 3/2012 Sakamoto et al.
2012/0280844 A1* 11/2012 Abe ........................ H04B 10/60 341/118
2012/0308227 A1* 12/2012 Komaki ........... H04B 10/25073 398/25

FOREIGN PATENT DOCUMENTS

| JP | 2011/015013 | 1/2011 |
| JP | 2011/166627 | 8/2011 |
| JP | 2012/049964 | 3/2012 |

OTHER PUBLICATIONS

Floyd M. Gardner, "A BPSK/QPSK Timing-Error Detector for Sampled Receivers", IEEE Transactions on Communications, vol. COM-34, No. 5, pp. 423-429, May 1986.

* cited by examiner

*Primary Examiner* — David Payne
*Assistant Examiner* — Omar S Ismail
(74) *Attorney, Agent, or Firm* — Staas & Halsey LLP

(57) ABSTRACT

A digital coherent receiver, includes: an acquisition circuit configured to acquire a plurality of digital electrical signals obtained by sampling a plurality of analog electrical signals by using a sampling signal and digitally converting the plurality of analog electrical signals, the plurality of analog electrical signals being obtained by subjecting a plurality of optical signals to photoelectric conversion; a phase deviation detector configured to output a detection value corresponding to a phase deviation between the sampling signal and the optical signals by using the digital electrical signals; a determination circuit configured to determine whether or not a variation amount of the detection value is equal to or less than a first variation amount; and a compensation circuit configured to compensate wavelength dispersion of the digital electrical signals based on the detection value when the variation amount is equal to or less than the first variation amount.

20 Claims, 12 Drawing Sheets

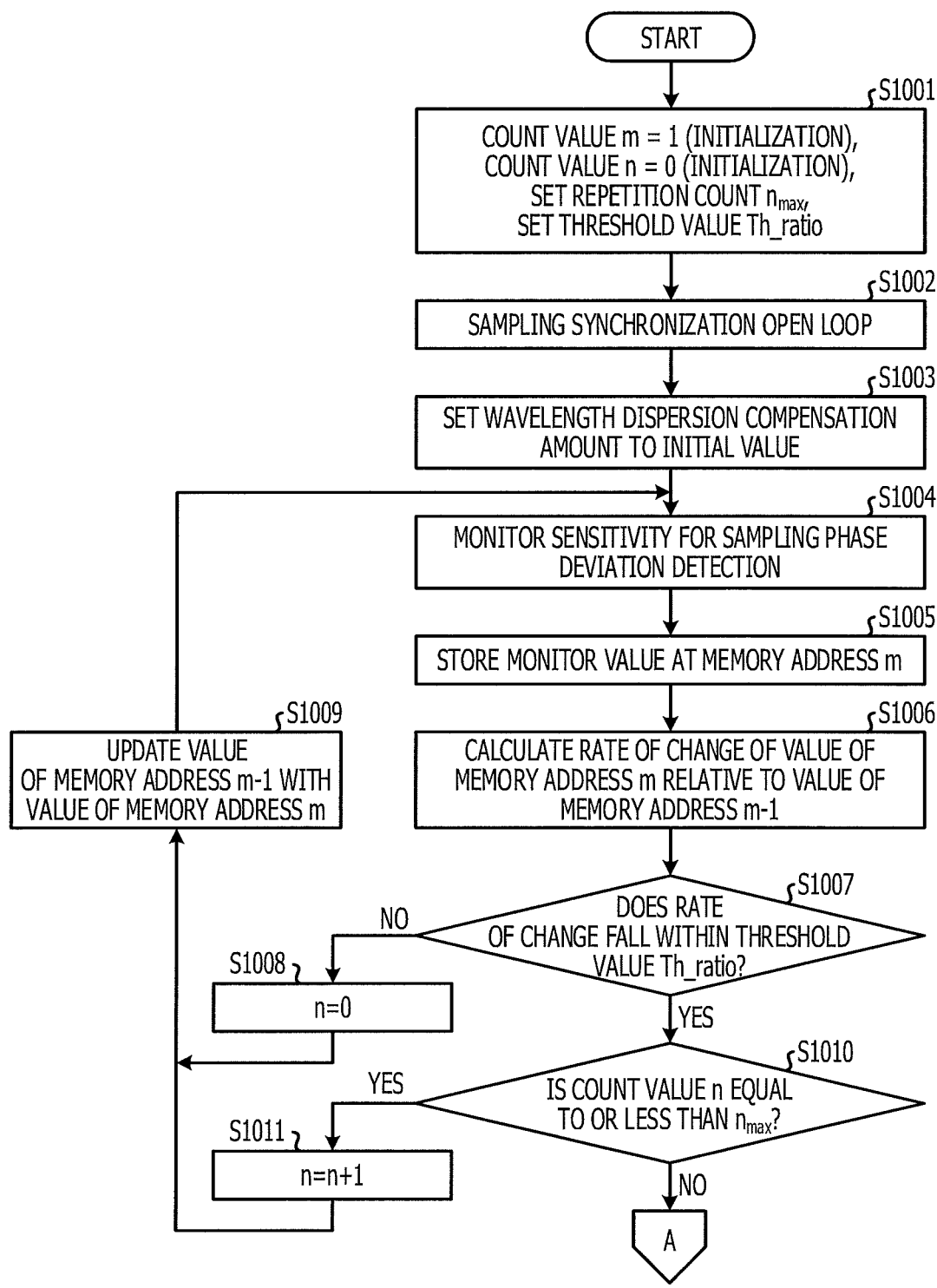

DIGITAL COHERENT RECEIVER, OPTICAL RECEPTION SYSTEM, AND OPTICAL RECEPTION METHOD

CROSS-REFERENCE TO RELATED APPLICATION

This application is based upon and claims the benefit of priority of the prior Japanese Patent Application No. 2013-097152, filed on May 2, 2013, the entire contents of which are incorporated herein by reference.

FIELD

The embodiments discussed herein are related to a digital coherent receivers, an optical reception system, and an optical reception method.

BACKGROUND

An increase in internet traffic has led to a demand for larger capacity of trunk line optical communication systems, and optical receivers/transmitters capable of transmitting signals at a rate of over 100 Gbit/s per wavelength are being researched and developed. As a bit rate per wavelength increases, a deterioration in signal quality occurs due to a degradation in the optical signal noise ratio (OSNR) tolerance, wavelength dispersion in a transmission path, or a waveform distortion caused by polarization mode dispersion or nonlinear effects.

Related arts are disclosed in Japanese Laid-open Patent Publication No. 2011-015013.

SUMMARY

According to one aspect of the embodiments, a digital coherent receiver, includes: an acquisition circuit configured to acquire a plurality of digital electrical signals obtained by sampling a plurality of analog electrical signals by using a sampling signal and digitally converting the plurality of analog electrical signals, the plurality of analog electrical signals being obtained by subjecting a plurality of optical signals to photoelectric conversion; a phase deviation detector configured to output a detection value corresponding to a phase deviation between the sampling signal and the optical signals by using the digital electrical signals; a determination circuit configured to determine whether or not a variation amount of the detection value is equal to or less than a first variation amount; and a compensation circuit configured to compensate wavelength dispersion of the digital electrical signals based on the detection value when the variation amount is equal to or less than the first variation amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a wavelength dispersion compensation operation.

DESCRIPTION OF EMBODIMENTS

For example, a digital coherent reception system having an OSNR tolerance and a tolerance for a waveform distortion in a transmission path may be employed. In the digital coherent reception system, a compensation amount of a dispersion compensation circuit is controlled based on a sensitivity for detecting a phase deviation between the frequency of a reception optical signal and a sampling signal in order to appropriately carry out dispersion compensation.

However, the sensitivity for detecting the phase deviation between the frequency of the reception optical signal and the sampling signal is also influenced by the optical signal intensity, and thus the accuracy of the dispersion compensation may be degraded depending on the state of the optical signal intensity.

Figure 1A:
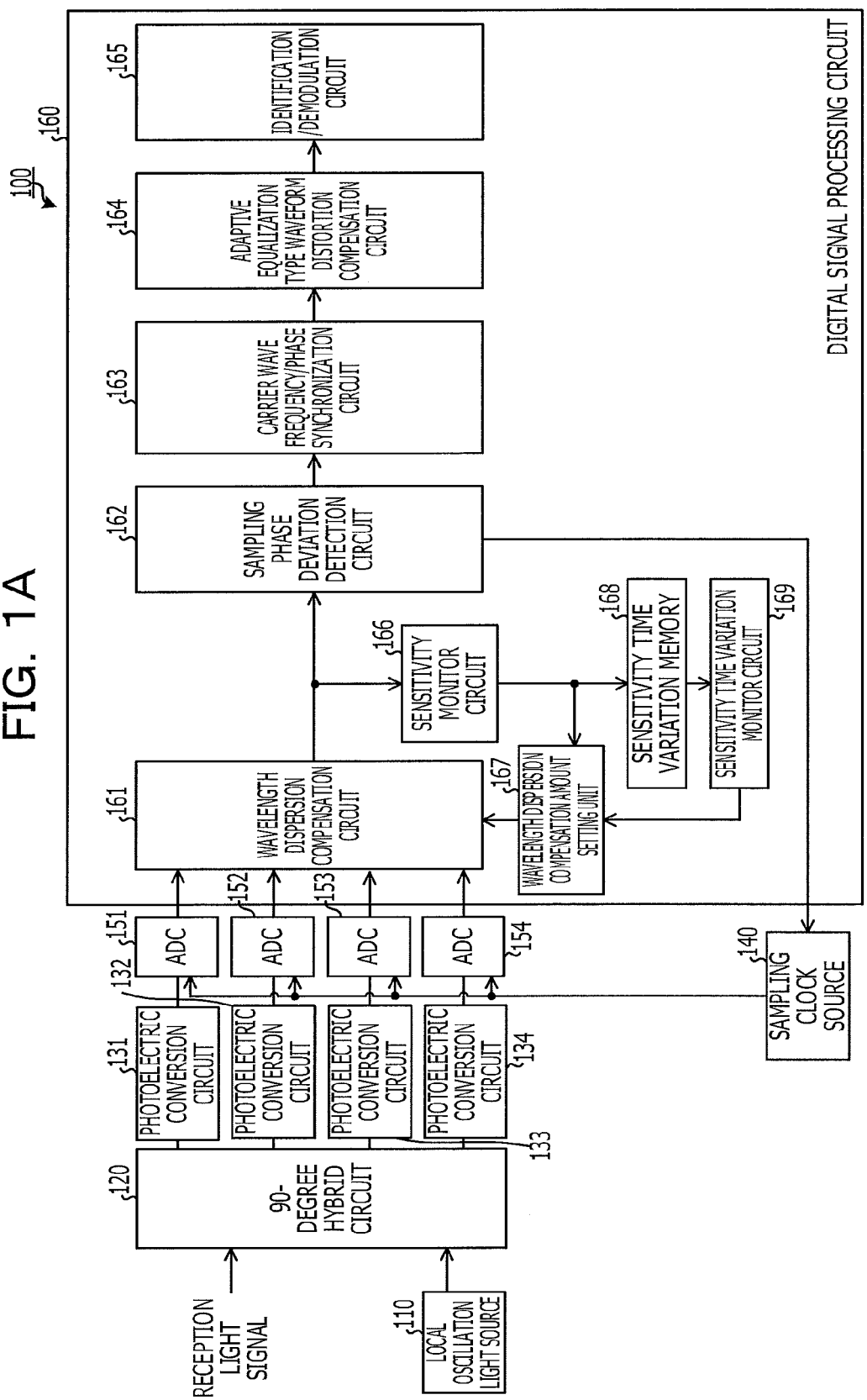
FIG. 1A illustrates an example of an optical reception device.

FIG. 1A illustrates an example of an optical reception device. An optical reception device 100 illustrated in FIG. 1A includes a local oscillation light source 110, a 90-degree hybrid circuit 120, photoelectric conversion circuits 131 to 134, a sampling clock source 140, analog/digital converters (ADCs) 151 to 154, and a digital signal processing circuit 160.

The optical reception device 100 may be an optical reception device of a coherent method, which employs the 90-degree hybrid circuit 120. The local oscillation light source 110 generates local oscillation light and outputs the generated local oscillation light to the 90-degree hybrid circuit 120. The 90-degree hybrid circuit 120 receives input of a reception optical signal and the local oscillation light output from the local oscillation light source 110. The 90-degree hybrid circuit 120 extracts a real part signal and an imaginary part signal of two orthogonally polarized waves of the input reception optical signal by using the input local oscillation light.

For example, the 90-degree hybrid circuit 120 includes two polarizing beam splitters and two 90-degree hybrids. The 90-degree hybrid circuit 120 splits the reception optical signal and the local oscillation light into optical signals of two polarization directions (H axis and V axis) through the polarizing beam splitters and extracts, by using the 90-degree hybrids, a real part component (I component) and an imaginary part component (Q component) from the optical signals by using the local oscillation light of each of the polarization directions.

The 90-degree hybrid circuit 120 outputs, to the photoelectric conversion circuit 131, an optical signal that corresponds to the amplitude and the phase of the I component of signal light polarized along the H axis (horizontal polarization). The 90-degree hybrid circuit 120 outputs, to the photoelectric conversion circuit 132, an optical signal that corresponds to the amplitude and the phase of the Q component of the signal light polarized along the H axis.

The 90-degree hybrid circuit 120 outputs, to the photoelectric conversion circuit 133, an optical signal that corresponds to the amplitude and the phase of the I component of signal light polarized along the V axis (vertical polarization). The 90-degree hybrid circuit 120 outputs, to the photoelectric conversion circuit 134, an optical signal that corresponds to the amplitude and the phase of the Q component of the signal light polarized along the V axis.

The photoelectric conversion circuit 131 subjects the light output from the 90-degree hybrid circuit 120 to photoelectric conversion and outputs, to the ADC 151, an electrical signal corresponding to the intensity of the received light. The photoelectric conversion circuit 132 subjects the light output from the 90-degree hybrid circuit 120 to photoelectric conversion and outputs, to the ADC 152, an electrical signal corresponding to the intensity of the received light. The photoelectric conversion circuit 133 subjects the light output from the 90-degree hybrid circuit 120 to photoelectric conversion and outputs, to the ADC 153, an electrical signal corresponding to the intensity of the received light. The photoelectric conversion circuit 134 subjects the light output from the 90-degree hybrid circuit 120 to photoelectric conversion and outputs, to the ADC 154, an electrical signal corresponding to the intensity of the received light. Each of the photoelectric conversion circuits 131 to 134 may, for example, be a photodiode (PD).

The sampling clock source 140 generates a clock signal that serves to determine a sampling timing and outputs the clock signal to each of the ADCs 151 to 154.

The ADC 151 digitally samples a signal output from the photoelectric conversion circuit 131, in synchronization with the clock of the clock signal output from the sampling clock source 140, and quantizes the sampled signal to carry out digital conversion. The ADC 152 digitally samples a signal output from the photoelectric conversion circuit 132, in synchronization with the clock of the clock signal output from the sampling clock source 140, and quantizes the sampled signal to carry out digital conversion.

The ADC 153 digitally samples a signal output from the photoelectric conversion circuit 133, in synchronization with the clock of the clock signal outputted from the sampling clock source 140, and quantizes the sampled signal to carry out digital conversion. The ADC 154 digitally samples a signal output from the photoelectric conversion circuit 134, in synchronization with the clock of the clock signal output from the sampling clock source 140, and quantizes the sampled signal to carry out digital conversion. Each of the ADCs 151 to 154 outputs the digitally converted signal to the digital signal processing circuit 160.

The digital signal processing circuit 160 includes a wavelength dispersion compensation circuit 161, a sampling phase deviation detection circuit 162, a carrier wave frequency/phase synchronization circuit 163, an adaptive equalization type waveform distortion compensation circuit 164, an identification/demodulation circuit 165, a sensitivity monitor circuit 166, a wavelength dispersion compensation amount setting unit 167, a sensitivity time variation memory 168, and a sensitivity time variation monitor circuit 169. The digital signal processing circuit 160 may correspond to a digital coherent receiver. The digital signal processing circuit 160 may be a digital circuit such as a digital signal processor (DSP). The digital signal processing circuit 160 may include a single DSP or may include a plurality of DSPs of different kinds.

The wavelength dispersion compensation circuit 161 compensates wavelength dispersion of signals output from the ADCs 151 to 154. For example, the wavelength dispersion compensation circuit 161 subjects the signals output from the ADCs 151 to 154 to digital signal processing to compensate the wavelength dispersion of the reception optical signal. The wavelength dispersion compensation circuit 161 carries out wavelength dispersion compensation in accordance with a compensation amount set by the wavelength dispersion compensation amount setting unit 167. The wavelength dispersion compensation circuit 161 outputs the signals of which the wavelength dispersion has been compensated to each of the sampling phase deviation detection circuit 162 and the sensitivity monitor circuit 166.

The sampling phase deviation detection circuit 162 detects a deviation in the phase of each of the signals output from the wavelength dispersion compensation circuit 161. For example, the sampling phase deviation detection circuit 162 outputs a detection value that corresponds to a phase deviation between the sampling signal used at the time of AD conversion and the analog electrical signals to be input to the ADCs 151 to 154, or for example, the modulation frequency of the reception optical signal. The sampling phase deviation detection circuit 162 controls the sampling clock source 140 by using the detection value obtained through the phase deviation detection and controls the phase or the frequency of the sampling signal. Thus, the sampling signal and the modulation frequency of the reception optical signal synchronize with each other.

The sampling phase deviation detection circuit 162 controls a phase synchronization loop of the sampling signal to a closed loop or to an open loop. For example, the sampling phase deviation detection circuit 162 provides feedback on the sampling phase deviation to the sampling clock source 140 to set the phase synchronization loop of the sampling signal to the open loop and carries out a wavelength dispersion compensation operation.

The sampling phase deviation detection circuit 162 stops providing feedback on the sampling phase deviation to the sampling clock source 140 to set the phase synchronization loop of the sampling signal to the closed loop. In this case, the wavelength dispersion compensation operation may not be carried out. When the phase synchronization loop of the sampling signal is set to the open loop, the sampling phase deviation detection circuit 162 controls the sampling clock source 140 by using the detection value obtained through the phase deviation detection to control the phase or the frequency of the sampling signal. This control may be carried out continuously.

The carrier wave frequency/phase synchronization circuit 163 corrects a phase rotation that is based on a deviation between the frequency of the reception optical signal and the frequency or the phase of the local oscillation light by using the signal output from the sampling phase deviation detection circuit 162 and synchronizes the frequency of the reception optical signal with the frequency of the local oscillation light. The carrier wave frequency/phase synchronization circuit 163 outputs signals of which the frequencies have been synchronized to the adaptive equalization type waveform distortion compensation circuit 164.

The adaptive equalization type waveform distortion compensation circuit 164 subjects each of the signals output from the carrier wave frequency/phase synchronization circuit 163 to waveform distortion compensation of an adaptive equalization type. For example, the adaptive equalization type waveform distortion compensation circuit 164 compensates a wavefront distortion component that has been generated in a transmission path and that varies at high speed. The adaptive equalization type waveform distortion compensation circuit 164 outputs signals of which the wavefront distortion components have been compensated to the identification/demodulation circuit 165. The identification/demodulation circuit 165 demodulates the signal output from the adaptive equalization type waveform distortion compensation circuit 164. The identification/demodulation circuit 165 outputs the demodulated data to the outside.

The sensitivity monitor circuit 166 monitors the sensitivity for sampling phase deviation detection. For example, the sensitivity monitor circuit 166 detects the sensitivity, to the phase deviation, of the detection value output by the sampling phase deviation detection circuit 162. The sensitivity monitor circuit 166 monitors the sensitivity for sampling phase deviation detection when the phase synchronization loop of the sampling signal is set to the open loop by the sampling phase deviation detection circuit 162. The sensitivity monitor circuit 166 outputs the monitored sensitivity (monitor value) for the sampling phase deviation detection to the wavelength dispersion compensation amount setting unit 167 and the sensitivity time variation memory 168.

The sensitivity time variation memory 168 stores the sensitivity for the sampling phase deviation detection output from the sensitivity monitor circuit 166. The sensitivity time variation monitor circuit 169 may refer to a value stored in the sensitivity time variation memory 168 to determine that a variation amount of the sensitivity has reached or fallen below a certain variation amount in a case in which a disparity among a plurality of sensitivities detected by the sensitivity monitor circuit 166 within a period has reached or fallen below a threshold value.

For example, the sensitivity time variation monitor circuit 169 may determine that a variation amount of the sensitivity has reached or fallen below a certain variation amount in a case in which a disparity among a plurality of sensitivities detected by the sensitivity monitor circuit 166 within a certain period has reached or fallen below a threshold value. The disparity may correspond to a difference or a ratio. For example, the sensitivity time variation monitor circuit 169 may determine that the variation amount of the sensitivity has reached the certain variation amount in a case in which a state in which a disparity among the sensitivities detected successively by the sensitivity monitor circuit 166 is equal to or less than the threshold value continues for a certain period or longer.

The sensitivity time variation monitor circuit 169 may determine whether or not the variation amount of the detection value output from the sampling phase deviation detection circuit 162 has reached or fallen below a certain variation amount. In this case, the sensitivity time variation monitor circuit 169 may determine that the variation amount of the detection value has reached or fallen below the certain variation amount in a case in which a disparity among a plurality of detection values output by the sampling phase deviation detection circuit 162 within a certain period has reached or fallen below a threshold value. The sensitivity time variation monitor circuit 169 may determine that the variation amount of the detection value has reached or fallen below a predetermined variation amount in a case in which a state in which a disparity among a plurality of detection values output by the sampling phase deviation detection circuit 162 within a certain period is equal to or less than a threshold value continues for a certain period or longer.

The wavelength dispersion compensation amount setting unit 167 sets the compensation amount of the wavelength dispersion compensation circuit 161. The wavelength dispersion compensation amount setting unit 167 compensates wavelength dispersion of a digital electrical signal based on the detection value output by the sampling phase deviation detection circuit 162. For example, the wavelength dispersion compensation amount setting unit 167 may set the compensation amount of the wavelength dispersion compensation circuit 161 such that the wavelength dispersion compensation circuit 161 does not compensate the wavelength dispersion until the sensitivity time variation monitor circuit 169 determines that the variation amount of the sensitivity has reached or fallen below the certain variation amount. For example, the wavelength dispersion compensation amount setting unit 167 sets, in the wavelength dispersion compensation circuit 161, a compensation amount that does not vary relative to the wavelength.

The wavelength dispersion compensation amount setting unit 167 may cause the wavelength dispersion compensation circuit 161 to compensate the wavelength dispersion upon the sensitivity time variation monitor circuit 169 determining that the variation amount of the sensitivity has reached or fallen below the certain variation amount. For example, the wavelength dispersion compensation amount setting unit 167 sets the compensation amount of the wavelength dispersion compensation circuit 161 based on the sensitivity for the sampling phase deviation detection output from the sensitivity monitor circuit 166 to cause the wavelength dispersion compensation circuit 161 to compensate the wavelength dispersion. The wavelength dispersion compensation amount setting unit 167 sets the compensation amount such that the sensitivity for the sampling phase deviation detection output from the sensitivity monitor circuit 166 becomes maximum.

The wavelength dispersion compensation amount setting unit 167 may cause the wavelength dispersion compensation circuit 161 to compensate the wavelength dispersion of a digital electrical signal based on the detection value in a case in which it is determined that the variation amount of the detection value output by the sampling phase deviation detection circuit 162 has reached or fallen below the certain variation amount.

The local oscillation light source 110, the 90-degree hybrid circuit 120, the photoelectric conversion circuits 131 to 134, the sampling clock source 140, and the ADCs 151 to 154 acquire a digital electrical signal from a received optical signal. In the acquisition processing, a plurality of analog electrical signals that have been obtained by subjecting a plurality of optical signals indicating the intensity information and the phase information of the received optical signal to photoelectric conversion are sampled by using a sampling signal, and thus a plurality of digitally converted digital electrical signals are acquired.

The 90-degree hybrid circuit 120 combines the received optical signal and the local oscillation light to obtain the plurality of optical signals indicating the intensity information and the phase information of the optical signal. The photoelectric conversion circuits 131 to 134 subject the plurality of optical signals, which have been obtained by the 90-degree hybrid circuit 120, to photoelectric conversion. The ADCs 151 to 154 sample the plurality of analog electrical signals, which have been converted by the photoelectric conversion circuits 131 to 134, by using the sampling signal to carry out the digital conversion.

The sampling phase deviation detection circuit 162 outputs a detection value corresponding to a phase deviation between the sampling signal and the optical signal by using the digital electrical signals acquired from the ADCs 151 to 154. The sensitivity monitor circuit 166 detects the sensitivity, to the phase deviation, of the detection value output by the sampling phase deviation detection circuit 162. The sensitivity time variation monitor circuit 169 determines whether or not the variation amount of the sensitivity detected by the sensitivity monitor circuit 166 has reached or fallen below a certain variation amount.

The wavelength dispersion compensation circuit 161 and the wavelength dispersion compensation amount setting unit 167 start the wavelength dispersion compensation of the digital electrical signals. In the compensation processing, the wavelength dispersion compensation of the digital electrical signals, which uses the sensitivity detected by the sensitivity monitor circuit 166, is started in a case in which the sensitivity time variation monitor circuit 169 determines that the variation amount of the sensitivity has reached or fallen below the certain variation amount.

Figure 1B:
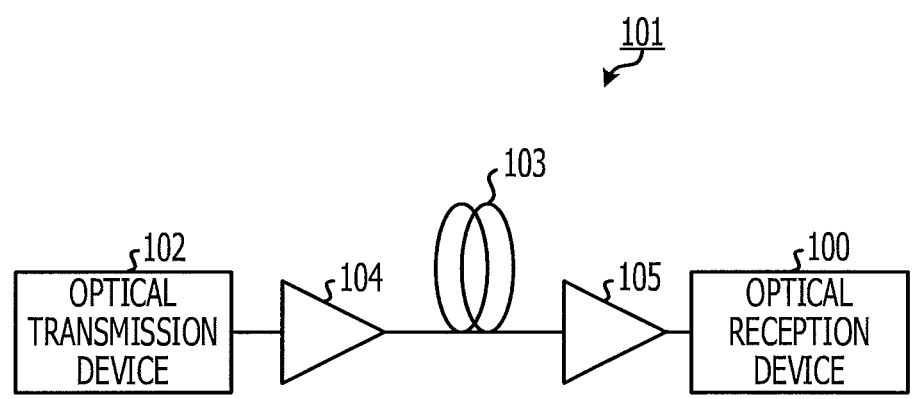
FIG. 1B illustrates an example of an optical transmission system.

FIG. 1B illustrates an example of an optical transmission system. An optical transmission system 101 illustrated in FIG. 1B includes the optical reception device 100, an optical transmission device 102, an optical transmission path 103, and amplifiers 104 and 105. The optical transmission device 102 transmits an optical signal to the optical reception device 100 through the optical transmission path 103. The amplifiers 104 and 105 are provided in the optical transmission path 103 to amplify the optical signal. For example, the amplifiers 104 and 105 may control the optical signal to have a gentle rising slope so that an optical surge does not occur at the rise of the optical signal. Thus, it may take time until the optical signal intensity stabilizes in the optical transmission system 101.

Figure 2:
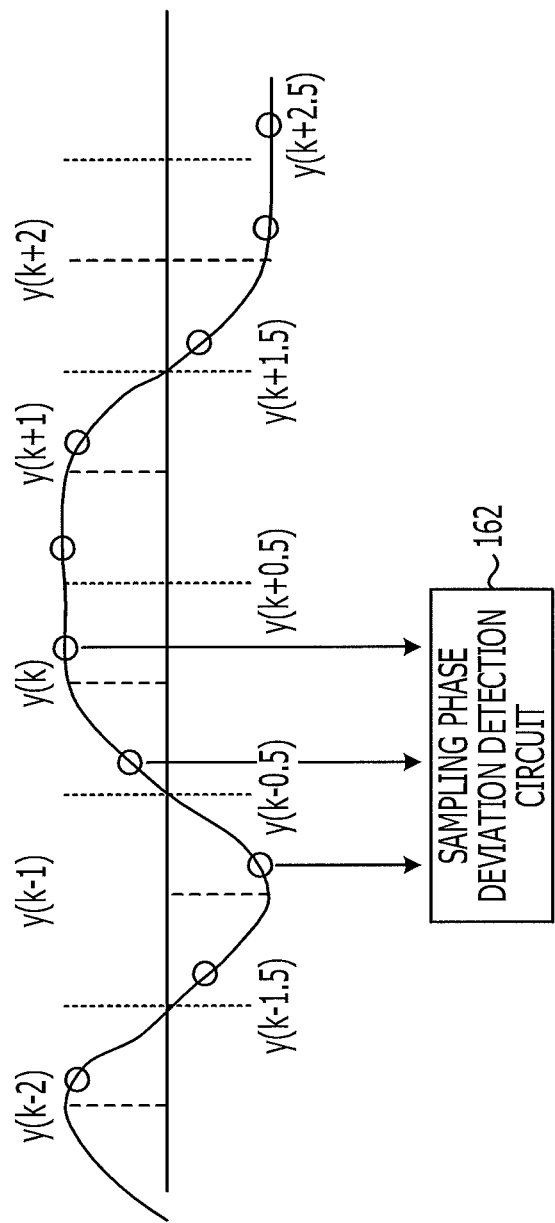
FIG. 2 illustrates an example of phase detection through Gardner's method.

FIG. 2 illustrates an example of phase detection through Gardner's method. The sampling phase deviation detection circuit 162 may include a phase detector that is compatible with the quadrature phase shift keying (QPSK) modulation method used in coherent transmission. For example, such a phase detector may be a phase detector of the Gardner's method (F. M. Gardner, "A BPSK/QPSK timing-error detector for sampled receivers", *IEEE Trans. Commun.*, vol. COM-34, pp. 423-429, May 1986).

The sampling phase deviation detection circuit 162 accepts input of an I component and a Q component of the H axis or the V axis which have been two-times oversampled and calculates, for each of the I component and the Q component, a product of an intra-signal difference by one symbol and a signal with a phase offset by a ½ symbol. The sampling phase deviation detection circuit 162 carries out processing of adding the calculated products at a symbol rate (=½ downsampling) to detect a phase signal in which the signal with a phase offset by a ½ symbol is a zero cross point.

For example, the sampling phase deviation detection circuit 162 may determine that the timing is ahead in a case in which $\{y(k)-y(k-1) \times y(k-0.5)\}<0$. The sampling phase deviation detection circuit 162 may determine that the timing is behind in a case in which $\{y(k)-y(k-1) \times y(k-0.5)\}>0$. The sampling phase deviation detection circuit 162 may carry out control so that the value of $\{y(k)-y(k-1) \times y(k-0.5)\}$ approaches 0.

Figure 3:
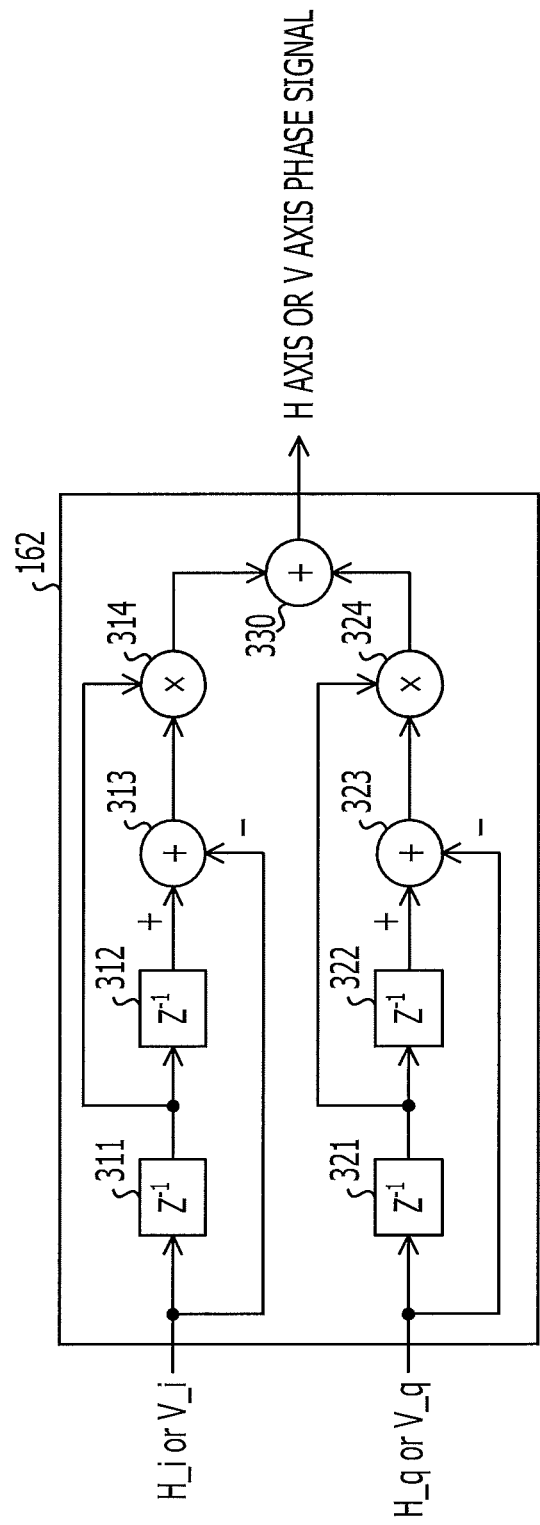
FIG. 3 illustrates an example of a sampling phase deviation detection circuit of Gardner's method.

FIG. 3 illustrates an example of a sampling phase deviation detection circuit of Gardner's method. The sampling phase deviation detection circuit 162 illustrated in FIG. 3 may be a phase detector of the Gardner's method. As illustrated in FIG. 3, the sampling phase deviation detection circuit 162 includes a delay element 311, a delay element 312, an addition unit 313, a multiplication unit 314, a delay element 321, a delay element 322, an addition unit 323, a multiplication unit 324, and an addition unit 330. The sampling phase deviation detection circuit 162 may receive input of, for example, a two-times oversampled signal.

An I channel component (H_i or V_i) of signal light inputted to the sampling phase deviation detection circuit 162 is input to the delay element 311 and the addition unit 313. The delay element 311 delays the input signal by an amount equivalent to a ½ symbol and outputs the delayed signal to the delay element 312 and the multiplication unit 314. The delay element 312 delays the signal output from the delay element 311 by an amount equivalent to a ½ symbol and outputs the delayed signal to the addition unit 313.

The addition unit 313 adds the signal output from the delay element 312 and a signal of a negative value of the signal input to the sampling phase deviation detection circuit 162 and outputs the result to the multiplication unit 314. For example, the addition unit 313 subtracts the signal input to the sampling phase deviation detection circuit 162 from the signal output from the delay element 312 and outputs the result to the multiplication unit 314. The signal output from the addition unit 313 may be a difference between signals offset by one symbol. The multiplication unit 314 multiplies the signal that has been output from the delay element 311 and that is offset by a ½ symbol by a difference between signals that are offset by one symbol, which has been output from the addition unit 313, and outputs the result to the addition unit 330.

A Q channel component (H_q or V_q) of signal light input to the sampling phase deviation detection circuit 162 is input to the delay element 321 and the addition unit 323. The delay element 321 delays the input signal by an amount equivalent to a ½ symbol and outputs the delayed signal to the delay element 322 and the multiplication unit 324. The delay element 322 delays the signal outputted from the delay element 321 by an amount equivalent to a ½ symbol and outputs the result to the addition unit 323.

The addition unit 323 adds the signal outputted from the delay element 322 and a signal of a negative value of the signal inputted to the sampling phase deviation detection circuit 162 and outputs the result to the multiplication unit 324. For example, the addition unit 323 subtracts the signal inputted to the sampling phase deviation detection circuit 162 from the signal outputted from the delay element 322 and outputs the result to the multiplication unit 324. The signal outputted from the addition unit 323 may be a difference between signals offset by one symbol. The multiplication unit 324 multiplies the signal that has been outputted from the delay element 321 and that is offset by a ½ symbol by a difference between signals that are offset buy one symbol, which has been outputted from the addition unit 323, and outputs the result to the addition unit 330.

The addition unit 330 adds the signal output from the multiplication unit 314 and the signal output from the multiplication unit 324 and outputs the result to a subsequent stage. The processing of the addition unit 330 may be carried out at a symbol rate (=½ downsampling). Thus, the signal output from the addition unit 330 may be a phase signal in which the signal with a phase offset by a ½ symbol is the zero cross point.

Figure 4:
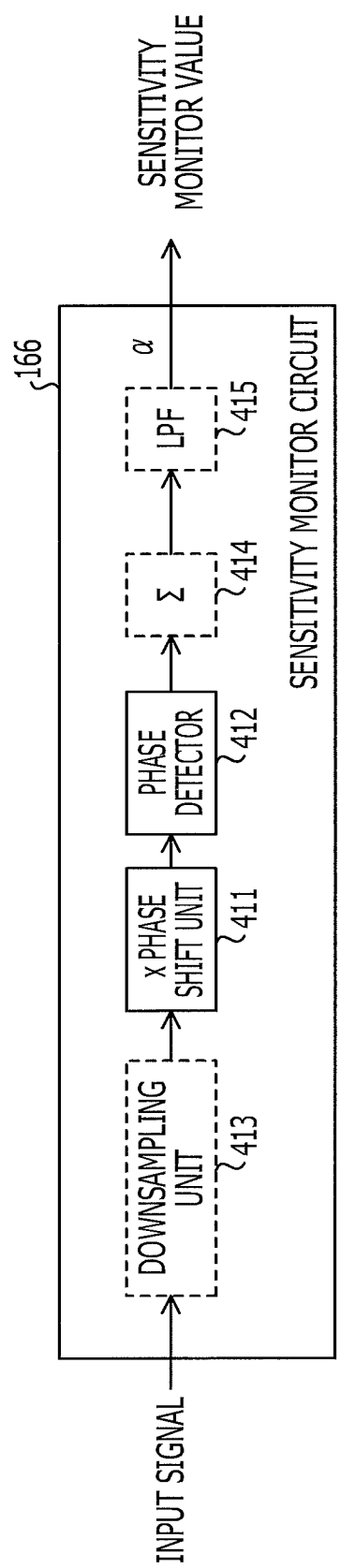
FIG. 4 illustrates an example of a sensitivity monitor circuit.

FIG. 4 illustrates an example of a sensitivity monitor circuit. FIG. 4 illustrates a configuration of a one side monitor. As illustrated in FIG. 4, the sensitivity monitor circuit 166 includes an x phase shift unit 411 and a phase detector 412. The x phase shift unit 411 shifts the phase of a signal input from the wavelength dispersion compensation circuit 161 by a shift amount x. For example, the x phase shift unit 411 generates a signal of which the phase is shifted by the shift amount x through an inter-sample interpolation or the like. The x phase shift unit 411 outputs the signal of which the phase has been shifted to the phase detector 412.

The phase detector 412 detects the phase of the signal output from the x phase shift unit 411. The phase detector 412 may be a phase detector having sensitivity degradation characteristics. The phase detector 412 outputs a phase signal indicating the detected phase to the wavelength dispersion compensation amount setting unit 167 and the sensitivity time variation memory 168 as a sensitivity monitor value (α).

In a case in which a parallel signal is input to the sensitivity monitor circuit 166, for example, a downsampling unit 413, which is provided at a stage preceding the x phase shift unit 411, may carry out downsampling in accordance with the sensitivity variation speed. The sensitivity monitor circuit 166 may operate at a speed that allows the sensitivity monitor circuit 166 to follow, among variations in the state of the optical transmission path, a variation that affects the phase detection sensitivity, or for example, a variation in the state of polarization characteristics. Thus, the configuration in which downsampling is carried out may be employed.

In a case in which a parallel signal is input to the sensitivity monitor circuit 166, an averaging unit 414 (Σ), which is provided at a stage following the phase detector 412, may average the phase signals for the signals output from the phase detector 412. In a case in which each of the signals of the H axis and the V axis is input to the sensitivity monitor circuit 166, a polarization diversity addition may be carried out in the averaging unit 414. A low pass filter 415, which is provided at an output stage of the sensitivity monitor circuit 166, may suppress broadband noise of the sensitivity monitor value.

Figure 5:
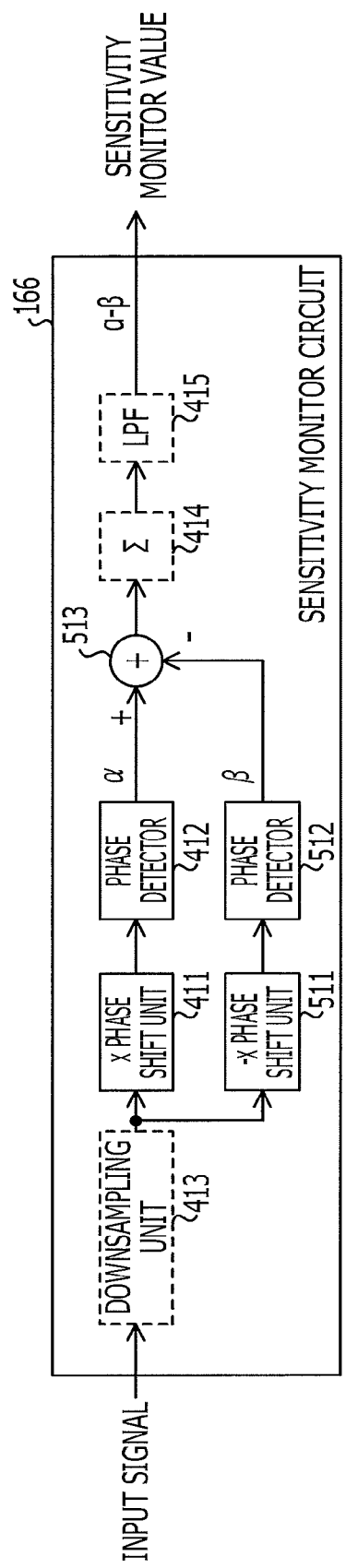
FIG. 5 illustrates an example of a sensitivity monitor circuit.

FIG. 5 illustrates an example of a sensitivity monitor circuit. FIG. 5 illustrates a configuration of a two side monitor. In FIG. 5, configurations that are substantially the same as or similar to the configurations illustrated in FIG. 4 are given identical reference numerals, and descriptions thereof may be omitted or reduced. As illustrated in FIG. 5, the sensitivity monitor circuit 166 may include, in addition to the configurations illustrated in FIG. 4, a −x phase shift unit 511, a phase detector 512, and an addition unit 513.

The phase detector 412 outputs a phase signal to the addition unit 513. The −x phase shift unit 511 shifts the phase of an input signal by a shift amount −x (opposite direction of the shift amount x). For example, the −x phase shift unit 511 generates a signal of which the phase is shifted by the shift amount −x through an inter-sample interpolation or the like. The −x phase shift unit 511 outputs the signal of which the phase has been shifted to the phase detector 512.

The phase detector 512 detects the phase of the signal output from the −x phase shift unit 511. The phase detector 512 may be a phase detector having sensitivity degradation characteristics, as with the phase detector 412. The phase detector 512 outputs a phase signal indicating the detected phase to the addition unit 513. The addition unit 513 adds the phase signal output from the phase detector 412 and a signal of a negative value of the phase signal output from the phase detector 512. For example, the addition unit 513 subtracts the phase signal output from the phase detector 512 from the phase signal output from the phase detector 412. The addition unit 513 outputs a phase signal indicating the result of the subtraction to the wavelength dispersion compensation amount setting unit 167 and the sensitivity time variation memory 168 as a sensitivity monitor value (α-β).

Figure 6:
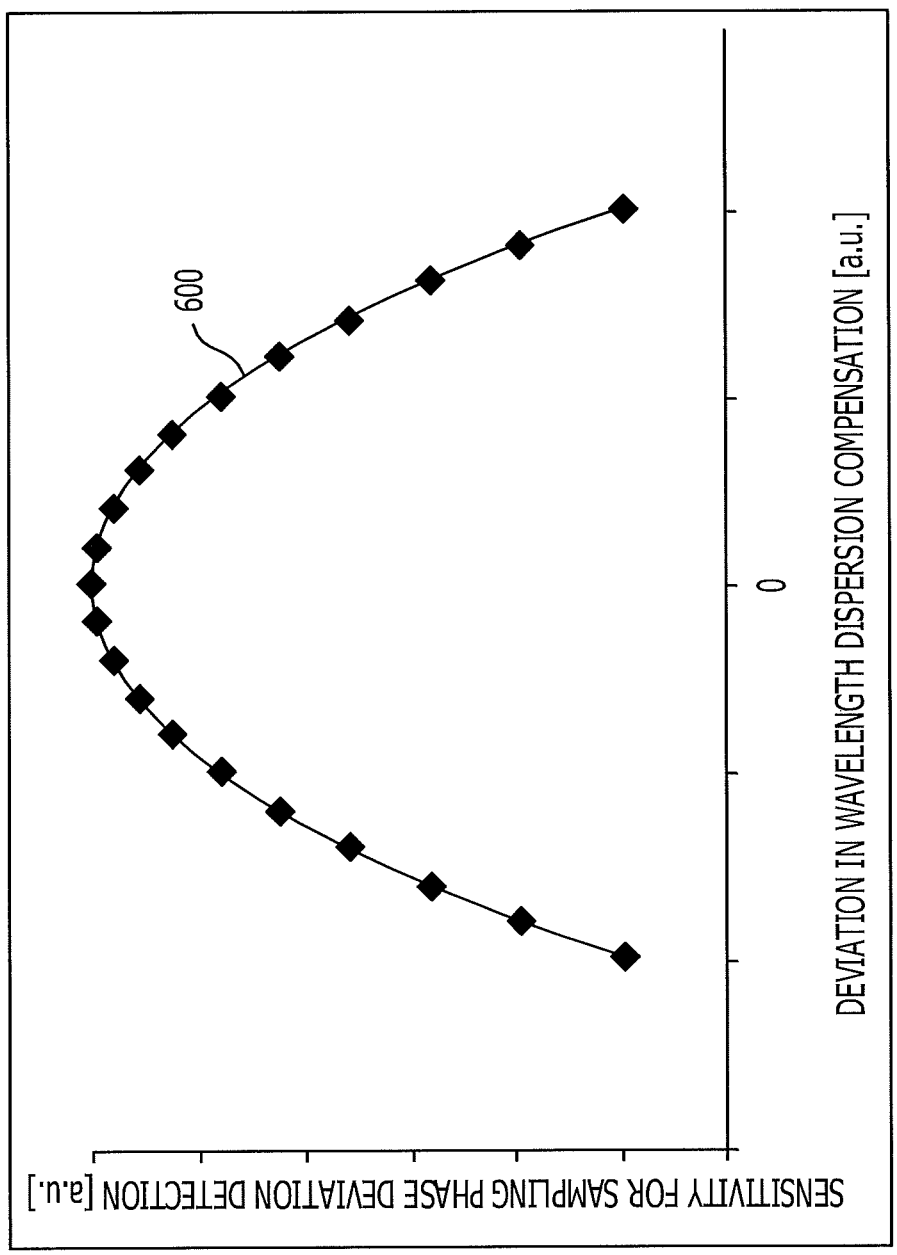
FIG. 6 illustrates an example of a relationship between a deviation of wavelength dispersion compensation and a sensitivity for sampling phase deviation detection.

FIG. 6 illustrates an example of a relationship between a deviation of wavelength dispersion compensation and a sensitivity for sampling phase deviation detection. In FIG. 6, the deviation [a.u.] of the wavelength dispersion compensation represented along the horizontal axis indicates a deviation of the compensation amount of the wavelength dispersion compensation circuit 161 from the wavelength dispersion amount of the reception optical signal. A state in which the wavelength dispersion compensation deviation is 0 indicates that the wavelength dispersion compensation circuit 161 has been capable of substantially compensating the wavelength dispersion. A state in which the wavelength dispersion compensation deviation is away from 0 indicates that residual wavelength dispersion that could not have been compensated by the wavelength dispersion compensation circuit 161 is large.

The sensitivity [a.u.] for the sampling phase deviation detection represented along the vertical axis indicates the sensitivity of the sampling phase deviation detection circuit 162. A relationship 600 indicates a relationship between a deviation of the compensation amount of the wavelength dispersion compensation circuit 161 from the wavelength dispersion amount of the reception optical signal and the sensitivity of the sampling phase deviation detection circuit 162.

As indicated by the relationship 600, when the wavelength dispersion compensation deviation is 0, the sensitivity for the sampling phase deviation detection reaches the maximum. As the wavelength dispersion compensation deviation shifts away from 0, the sensitivity for the sampling phase deviation detection decreases. When a distortion in the waveform caused by the wavelength dispersion reaches the minimum, or for example, when the dispersion compensation amount becomes optimal, the effect on the sampling waveform due to the wavelength dispersion reaches the minimum, or for example, the wavelength dispersion compensation deviation becomes 0, and thus the sensitivity for the phase deviation detection reaches the maximum.

Figure 7:
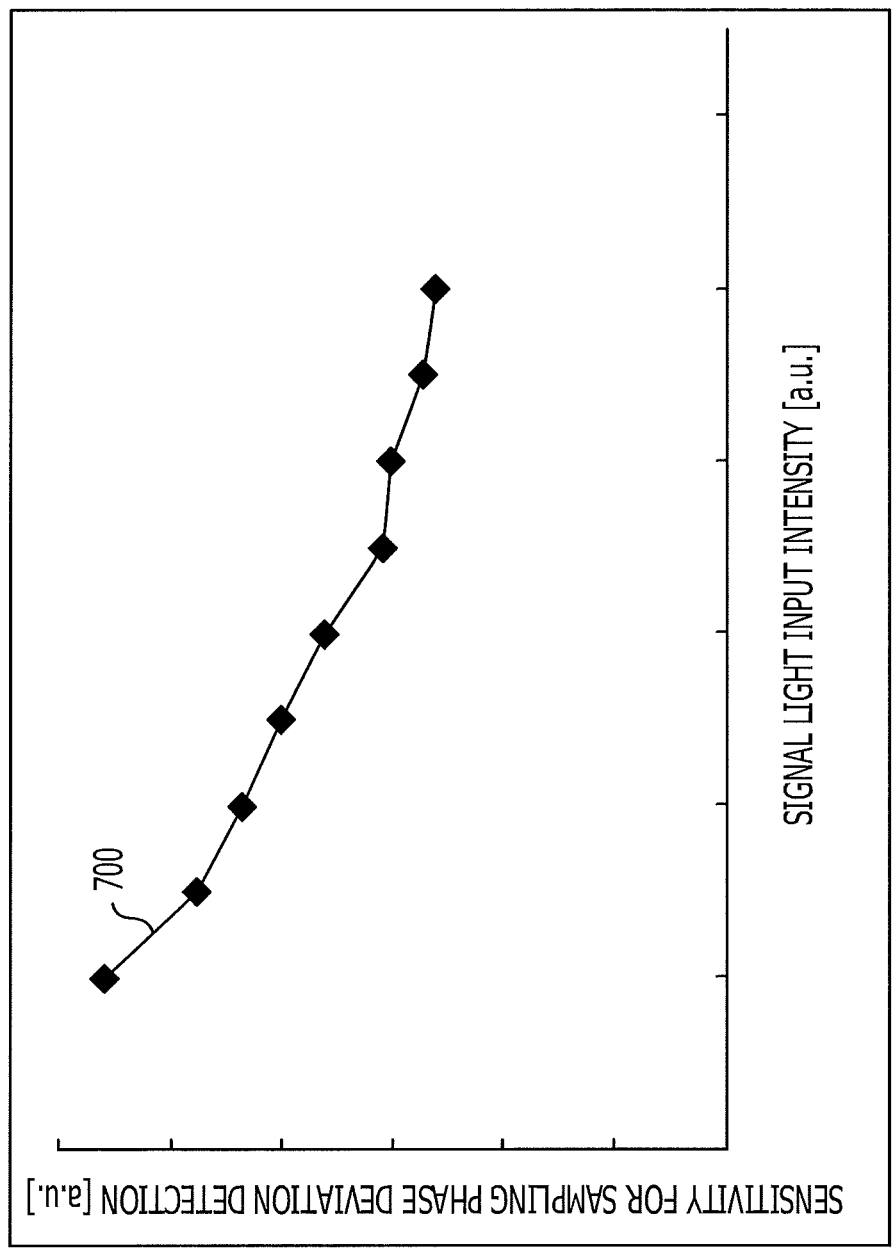
FIG. 7 illustrates an example of a relationship between a signal light input intensity and a sensitivity for sampling phase deviation detection.

FIG. 7 illustrates an example of a relationship between a signal light input intensity and a sensitivity for sampling phase deviation detection. In FIG. 7, the signal light input intensity [a.u.] represented along the horizontal axis indicates the intensity of the signal light to be input to the sampling phase deviation detection circuit 162. The sensitivity [a.u.] for the sampling phase deviation detection represented along the vertical axis indicates the sensitivity of the sampling phase deviation detection circuit 162. A relationship 700 indicates a relationship between the intensity of the signal light to be input to the sampling phase deviation detection circuit 162 and the sensitivity of the sampling phase deviation detection circuit 162.

As indicated by the relationship 700, the sensitivity for the sampling phase deviation detection decreases along with an increase in the signal light input intensity. In this manner, the sensitivity for the sampling phase deviation detection depends not only on the deviation of the wavelength dispersion compensation as indicated in FIG. 6 but also on the signal light input intensity. In the relationship 700, the sensitivity for the sampling phase deviation detection decreases along with an increase in the signal light input intensity. For example, depending on the configuration of the optical reception device 100 or of the optical transmission system 101, the sensitivity for the sampling phase deviation detection may increase along with an increase in the signal light input intensity.

For example, in a case in which the optical amplifier 105 illustrated in FIG. 1B is controlled to have a gentle rising slope so that an optical surge does not occur at a rise of an optical signal, it may take time until the optical signal intensity stabilizes. If dispersion compensation is carried out in an environment in which the optical signal intensity varies, the dispersion compensation amount may not be estimated accurately. Consequently, an erroneous determination may be made, and thus appropriate dispersion compensation may not be carried out.

The time it takes for the signal light input intensity to stabilize may differ depending, for example, on the configuration of the optical reception device 100 or of the optical transmission system 101. If a given time it takes for the signal light input intensity to stabilize reliably is preset, it may not be possible to carry out the dispersion compensation until that given time elapses even in a case in which the signal light input intensity has stabilized. For example, the dispersion compensation may not be carried out promptly.

A method for monitoring the presence of a variation in the optical signal intensity includes a method in which the optical intensity is monitored directly by using a device such as a TAP-PD. In this method, a mean intensity of the incident light is monitored. Thus, in terms of the operation of the transmission device, in a case in which control is carried out so as not to stop the output of the optical amplifier provided in the transmission path even when the output of the signal light from the transmission side is being stopped, spontaneous emission light noise emitted from the optical amplifier continues to be inputted to the reception side. Therefore, it may be difficult to determine from the mean intensity of the incident light as to whether or not a signal component is included in the input light.

For example, in order to improve the accuracy of the dispersion compensation, the dispersion compensation is carried out after the intensity of the reception optical signal stabilizes. By monitoring a temporal variation in the sensitivity for sampling phase deviation detection, the stabilization of the intensity of the reception optical signal may be determined with high accuracy.

Figure 8A:
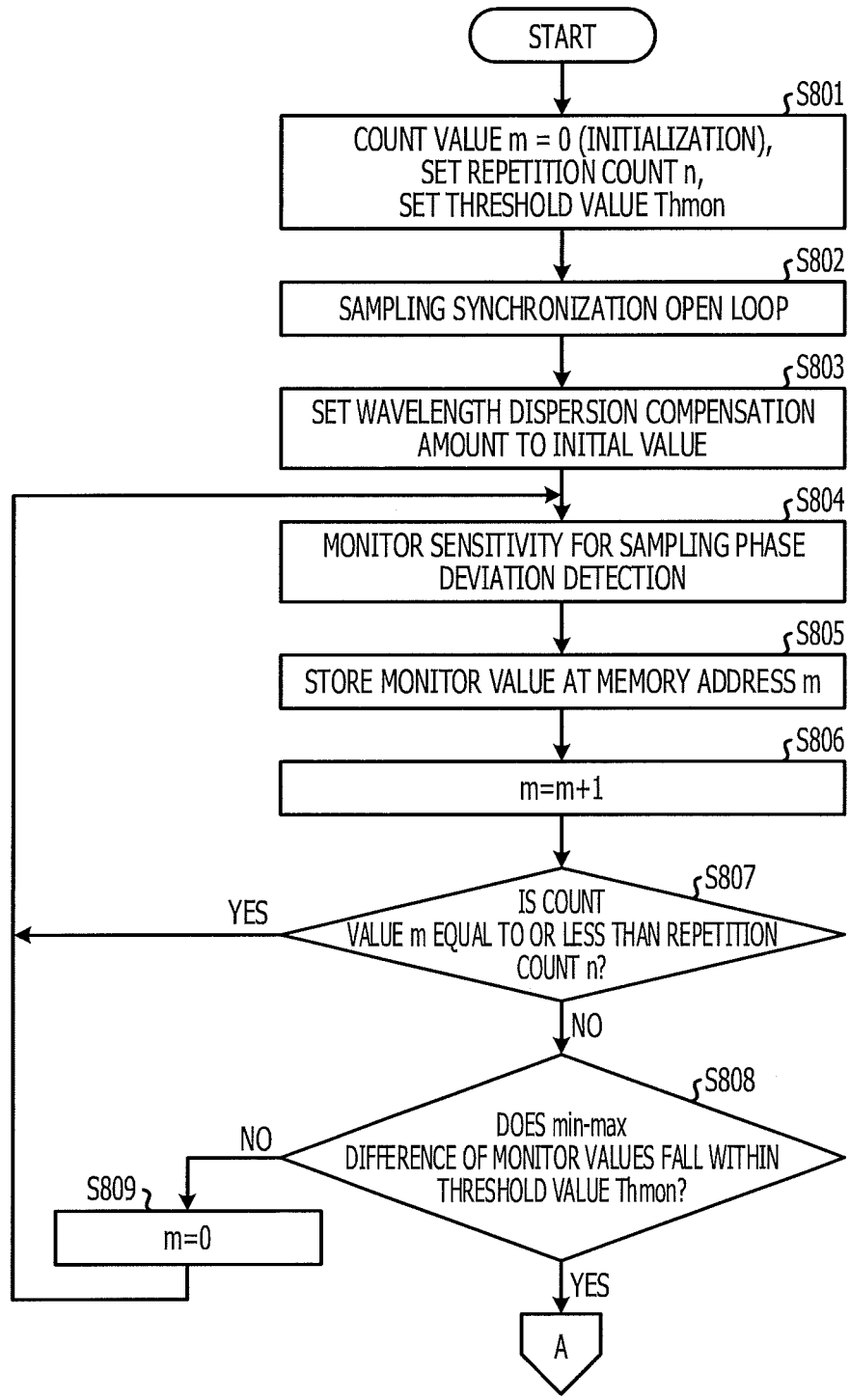
FIG. 8A illustrates an example of a wavelength dispersion compensation operation.
Figure 8B:
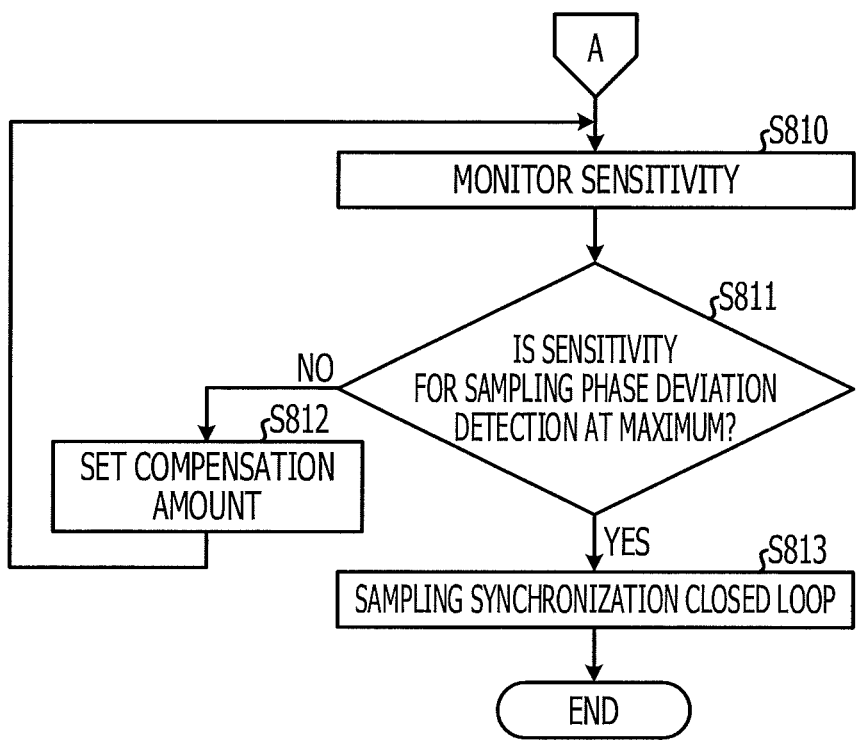
FIG. 8B illustrates an example of a wavelength dispersion compensation operation.

FIG. 8A illustrates an example of a wavelength dispersion compensation operation. FIG. 8B illustrates an example of a wavelength dispersion compensation operation. In FIGS. 8A and 8B, the wavelength dispersion compensation operation is carried out by the digital signal processing circuit. In FIGS. 8A and 8B, for example, in a case in which a difference between a maximum value and a minimum value of a plurality of sensitivities detected by the sensitivity monitor circuit 166 within a certain period has reached or fallen below a threshold value, it is determined that a variation amount in the sensitivity has reached or fallen below a certain variation amount.

In the digital signal processing circuit 160, the sensitivity time variation monitor circuit 169 sets a count value m to 0, sets an acquisition repetition count n, and sets a threshold value Thmon for determining the presence of a temporal variation (operation S801).

The sampling phase deviation detection circuit 162 sets a PLL loop of sampling synchronization to an open loop so as not to influence the wavelength dispersion compensation operation (operation S802). The sensitivity time variation monitor circuit 169 sets the wavelength dispersion compensation amount to an initial value (operation S803).

The sensitivity monitor circuit 166 monitors the sensitivity for sampling phase deviation detection (operation S804). The digital signal processing circuit 160 stores a monitor value of the phase deviation detection sensitivity in the sensitivity time variation memory 168 at a memory address that corresponds to the count value m (operation S805). The sensitivity time variation monitor circuit 169 increments the count value m (operation S806) and also determines whether or not the count value m is equal to or less than the repetition count n (operation S807).

If the count value m is equal to or less than the repetition count n (operation S807: Yes), the processing returns to operation S804. If the count value m exceeds the repetition count n (operation S807: No), the sensitivity time variation monitor circuit 169 determines whether or not a min-max difference of the monitor values stored in the sensitivity time variation memory 168 at each memory address falls within the threshold value Thmon (operation S808). A monitor value at a memory address may be a monitor value at each of the memory addresses 0 to m. The min-max difference of the monitor values may be a difference between a minimum value and a maximum value.

If the min-max difference of the monitor values at each memory address does no fall within the threshold value Thmon (operation S808: No), the sensitivity time variation monitor circuit 169 resets the count value m to 0 (operation S809), and the processing then returns to operation S804. In a case in which the min-max difference of the monitor values at each memory address does not fall within the threshold value Thmon, the environment may be such that the signal intensity has not stabilized after the optical signal has been input.

If the min-max difference of the monitor values at each memory address falls within the threshold value Thmon (operation S808: Yes), the sensitivity monitor circuit 166 monitors the sensitivity for sampling phase deviation detection (operation S810). The wavelength dispersion compensation amount setting unit 167 determines whether or not the sensitivity for the sampling phase deviation detection is at a maximum, for example, in the relationship indicated in FIG. 6 (operation S811).

If the sensitivity for the sampling phase deviation detection is not at a maximum (operation S811: No), the wavelength dispersion compensation amount setting unit 167 sets the compensation amount of the wavelength dispersion compensation circuit 161 (operation S812), and the processing then returns to operation S810. Operation S812 may be repeated until the sensitivity for the sampling phase deviation detection reaches the maximum. Upon the sensitivity for the sampling phase deviation detection reaching the maximum (operation S811: Yes), the sampling phase deviation detection circuit 162 sets the PLL loop of the sampling synchronization to a closed loop (operation S813), and the wavelength dispersion compensation operation is then terminated. After the processing in operation S813, for example, waveform distortion compensation of the adaptive equalization type or the like may be carried out by the adaptive equalization type waveform distortion compensation circuit 164.

In the flowchart described above, in a case in which the monitor value (min-max difference) of the phase deviation detection sensitivity after reaching the repetition count n is equal to or less than the threshold value Thmon, the compensation amount of the wavelength dispersion compensation circuit 161 may be set. For example, the compensation amount of the wavelength dispersion compensation circuit 161 may be set upon the monitor value of the phase deviation detection sensitivity stabilizing after a certain time has elapsed since the rise, for example, after the repetition count has reached n. Thus, it may be determined with high accuracy that the environment is such that the optical signal intensity has stabilized. As the dispersion compensation is carried in an environment in which the optical signal intensity has stabilized, the accuracy of the dispersion compensation may improve.

In FIGS. 8A and 8B, it is determined whether or not a difference between a maximum value and a minimum value of a plurality of sensitivities detected by the sensitivity monitor circuit 166 within a certain period has reached or fallen below a threshold value. Although a difference is used as a basis for the determination, a ratio may be used instead.

Each of the processes described above may be carried out when the optical signal rises and may also be carried out when the optical signal rises again after a disconnection. For example, the compensation amount set at the first instance of the rise may be stored in a memory, and the compensation amount stored in the memory may be used at a subsequent instance of the rise. In this case, in place of operations S810 to S812, processing of setting a storage value of the memory may be carried out. Thus, processing to be carried out at the subsequent instance of the rise may be simplified.

Figure 9:
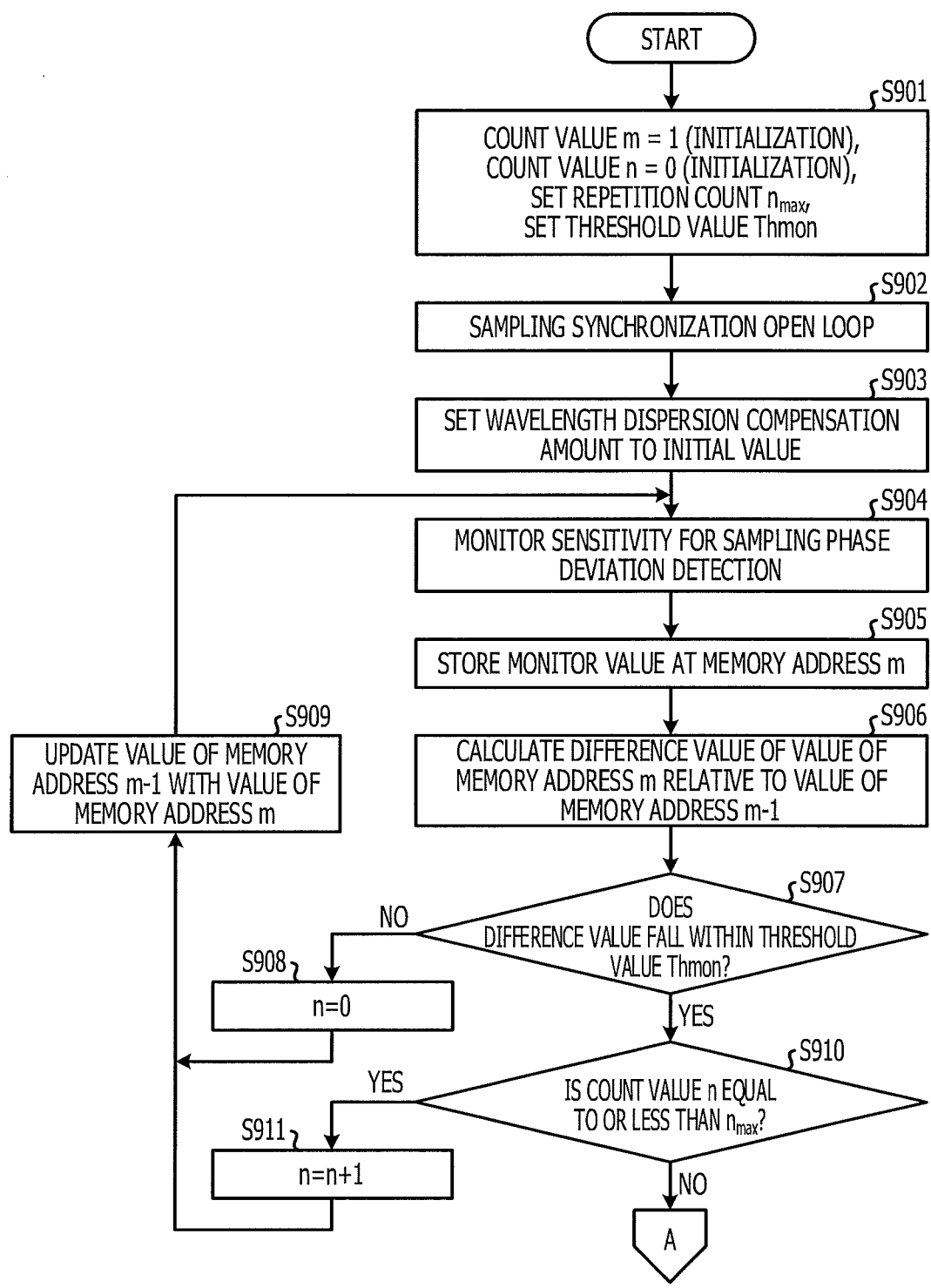
FIG. 9 illustrates an example of a wavelength dispersion compensation operation.

FIG. 9 illustrates an example of a wavelength dispersion compensation operation. In FIG. 9, the wavelength dispersion compensation operation is carried out by the digital signal processing circuit. A method for determining whether or not the optical signal intensity has stabilized in the wavelength dispersion compensation operation indicated in FIG. 9 may differ from the determination method in the wavelength dispersion compensation operation indicated in FIGS. 8A and 8B. In FIG. 9, it may be determined that the variation amount of the sensitivity has reached the certain variation amount in a case in which a state in which a difference among the sensitivities detected successively by the sensitivity monitor circuit 166 is equal to or less than the threshold value continues for a certain period or longer. In FIG. 9, the processing to be carried out after the determination of No in operation S910 may be substantially the same as or similar to the processing carried out in and after operation S810 indicated in FIG. 8B, and thus descriptions thereof may be omitted or reduced.

In FIG. 9, the sensitivity time variation monitor circuit 169 of the digital signal processing circuit 160 sets a count value m to 1 and a count value n to 0, sets the acquisition repetition count $n_{max}$, and sets a threshold value Thmon (operation S901).

The sampling phase deviation detection circuit 162 sets a PLL loop of sampling synchronization to an open loop so as not to influence the wavelength dispersion compensation operation (operation S902). The sensitivity time variation monitor circuit 169 sets the wavelength dispersion compensation amount to an initial value (operation S903).

The sensitivity monitor circuit 166 monitors the sensitivity for sampling phase deviation detection (operation S904). The digital signal processing circuit 160 stores a monitor value of the phase deviation detection sensitivity in the sensitivity time variation memory 168 at a memory address that corresponds to the count value m (operation S905). The digital signal processing circuit 160 calculates a difference value of the value of the memory address m relative to the value of a memory address m−1 (operation S906). The sensitivity time variation monitor circuit 169 determines whether or not the calculated difference value of the value of the memory address m relative to the value of the memory address m−1 falls within the threshold value Thmon (operation S907).

If the calculated difference value of the value of the memory address m relative to the value of the memory address m−1 does not fall within the threshold value Thmon (operation S907: No), the sensitivity time variation monitor circuit 169 sets the count value n to 0 (operation S908). In a case in which the calculated difference value of the value of the memory address m relative to the value of the memory address m−1 does not fall within the threshold value Thmon, the environment may be such that the optical signal intensity have not stabilized. The sensitivity time variation monitor circuit 169 updates the value of the memory address m−1 in the sensitivity time variation memory 168 with the value of the memory address m (operation S909), and the processing then returns to operation S904.

In operation S907, if the difference value falls within the threshold value Thmon (operation S907: Yes), the sensitivity time variation monitor circuit 169 determines whether or not the value of the count value n is equal to or less than $n_{max}$ (operation S910). If the value of the count value n is equal to or less than $n_{max}$ (operation S910: Yes), the sensitivity time variation monitor circuit 169 increments the count value n (operation S911), and the processing then proceeds to operation S909.

In a case in which the value of the count value n is equal to or less than $n_{max}$, a certain period has not elapsed. In operation S910, if the value of the count value n exceeds $n_{max}$ (operation S910: No), the processing proceeds to operation S810 of FIG. 8B.

In the flowchart described above, in a case in which a difference value between a monitor value of the sensitivity for a previous instance of phase deviation detection and a monitor value of the sensitivity for a current instance of phase deviation detection falls within the threshold value Thmon consecutively $n_{max}$ times, the compensation amount of the wavelength dispersion compensation circuit 161 is set. Thus, it may be determined with high accuracy that the environment is such that the optical signal intensity has stabilized. As the dispersion compensation is carried in an environment in which the optical signal intensity has stabilized, the accuracy of the dispersion compensation may improve.

FIG. 10 illustrates an example of a wavelength dispersion compensation operation. In FIG. 10, the wavelength dispersion compensation operation is carried out by the digital signal processing circuit. A method for determining whether or not the optical signal intensity has stabilized in the wavelength dispersion compensation operation indicated in FIG. 10 may differ from the determination method in the wavelength dispersion compensation operation indicated in FIGS. 8A and 8B. In FIG. 10, it may be determined that a variation amount of the sensitivity has reached a certain variation amount in a case in which a state in which a rate of change (ratio) of sensitivities detected successively by the sensitivity monitor circuit 166 is equal to or less than the threshold value continues for a certain period or longer. In FIG. 10, the processing to be carried out after the determination of No in operation S1010 may be substantially the same as or similar to the processing carried out in and after operation S810 indicated in FIG. 8B, and thus descriptions thereof may be omitted or reduced.

In FIG. 10, the sensitivity time variation monitor circuit 169 of the digital signal processing circuit 160 sets a count value m to 1 and a count value n to 0 and sets the acquisition repetition count $n_{max}$ and a threshold value Th_ratio (operation S1001).

The sampling phase deviation detection circuit 162 sets a PLL loop of sampling synchronization to an open loop so as not to influence the wavelength dispersion compensation operation (operation S1002). The sensitivity time variation monitor circuit 169 sets the wavelength dispersion compensation amount to an initial value (operation S1003).

The sensitivity monitor circuit 166 monitors the sensitivity for sampling phase deviation detection (operation S1004). The digital signal processing circuit 160 stores a monitor value of the phase deviation detection sensitivity in the sensitivity time variation memory 168 at a memory address that corresponds to the count value m (operation S1005). The digital signal processing circuit 160 calculates a rate of change of the value of a memory address m relative to the value of a memory address m−1 (operation S1006). The sensitivity time variation monitor circuit 169 determines whether or not the calculated rate of change of the value of the memory address m relative to the value of the memory address m−1 falls within the threshold value Th_ratio (operation S1007).

If the rate of change of the value of the memory address m relative to the value of the memory address m−1 does not fall within the threshold value Th_ratio (operation S1007: No), the sensitivity time variation monitor circuit 169 sets the count value n to 0 (operation S1008). In a case in which the calculated rate of change of the value of the memory address m relative to the value of the memory address m−1 does not fall within the threshold value Th_ratio, the environment may be such that the optical signal intensity have not stabilized. The sensitivity time variation monitor circuit 169 updates the value of the memory address m−1 in the sensitivity time variation memory 168 with the value of the memory address m (operation S1009), and the processing then returns to operation S1004.

In operation S1007, if the rate of change falls within the threshold value Th_ratio (operation S1007: Yes), the sensitivity time variation monitor circuit 169 determines whether or not the count value n is equal to or less than $n_{max}$ (operation 81010). If the value of the count value n is equal to or less than $n_{max}$ (operation 81010: Yes), the sensitivity time variation monitor circuit 169 increments the count value n (operation 81011), and the processing then proceeds to operation S1009.

In a case in which the value of the count value n is equal to or less than $n_{max}$, a certain period has not elapsed. In operation 81010, if the value of the count value n exceeds $n_{max}$ (operation 81010: No), the processing proceeds to operation S810 of FIG. 8B.

In the flowchart described above, in a case in which the rate of change between the monitor value of the sensitivity for a previous instance of phase deviation detection and the monitor value of the sensitivity for a current instance of phase deviation detection falls within the threshold value Th_ratio consecutively $n_{max}$ times, the compensation amount of the wavelength dispersion compensation circuit 161 may be set. Thus, it may be determined with high accuracy that the environment is such that the optical signal intensity has stabilized. As the dispersion compensation is carried in an environment in which the optical signal intensity has stabilized, the accuracy of the dispersion compensation may improve.

As a temporal variation in the sensitivity for the sampling phase deviation detection is monitored, the stabilization of the intensity of the reception optical signal may be determined with high accuracy. The dispersion compensation may be carried out after the intensity of the reception optical signal stabilizes. Thus, the accuracy of the dispersion compensation may improve, and the deterioration of the signal quality may be suppressed.

In a case in which the disparity (min-max difference in FIG. 8A) among the plurality of sensitivities detected within a certain period has reached or fallen below the threshold value (Thmon), it may be determined that the variation amount of the sensitivity has reached or fallen below a certain variation amount. Thus, it may be determined with high accuracy that the environment is such that the optical signal intensity has stabilized. The compensation amount of the wavelength dispersion compensation circuit 161 may be set after the monitor value of the phase deviation detection sensitivity stabilizes. As the dispersion compensation is carried in an environment in which the optical signal intensity has stabilized, the accuracy of the dispersion compensation may improve, and thus a deterioration in the signal quality may be suppressed.

It may be determined that a variation amount of the sensitivity has reached a certain variation amount in a case in which a state in which the disparity among the sensitivities detected successively, or for example, the difference indicated in FIG. 9 or the rate of change indicated in FIG. 10 is equal to or less than a threshold value continues for a certain period or longer. The compensation amount of the wavelength dispersion compensation circuit 161 may be set after it is determined with high accuracy that the environment is such that the optical signal intensity has stabilized and after the monitor value of the phase deviation detection sensitivity has stabilized. Accordingly, the dispersion compensation is carried in an environment in which the optical signal intensity has stabilized, thus, the accuracy of the dispersion compensation may improve, and a deterioration of the signal quality may be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital coherent receiver, comprising:
   an acquisition circuit configured to acquire a plurality of digital electrical signals obtained by sampling a plurality of analog electrical signals by using a sampling signal and digitally converting the plurality of analog electrical signals, the plurality of analog electrical signals being obtained by subjecting a plurality of optical signals to photoelectric conversion;
   a wavelength dispersion compensation circuit, coupled to the acquisition circuit, configured to compensate wavelength dispersion of the digital electrical signals;
   a phase deviation detector, coupled to the wavelength dispersion compensation circuit, configured to output a detection value corresponding to a phase deviation between the sampling signal and the optical signals by using the digital electrical signals output from the wavelength dispersion compensation circuit;
   a sensitivity monitor circuit, coupled to the wavelength dispersion compensation circuit, configured to monitor the digital electrical signals output from the wavelength dispersion compensation circuit; and
   a determination, coupled to the sensitivity monitor circuit, circuit configured to determine whether or not a variation amount of a monitor value output from the sensitivity monitor circuit is equal to or less than a first variation amount and
   output, to the wavelength dispersion compensation circuit, a compensation amount for compensating wavelength dispersion of the digital electrical signals based on the monitor value when the variation amount equal to or less than the first variation amount.

2. The digital coherent receiver according to claim 1, wherein the determination circuit determines that the variation amount of the monitor value is equal to or less than has reached or fallen below the first variation amount when a disparity among a plurality of monitor values detected by the sensitivity monitor circuit in a period of time has is equal to or less than a threshold value.

3. The digital coherent receiver according to claim 2, wherein the determination circuit determines that the variation amount of the monitor value is equal to or less than the first variation amount when a difference between a maximum value and a minimum value of the plurality of monitor values is equal to or less than a threshold value.

4. The digital coherent receiver according to claim 2, wherein the determination circuit determines that the variation amount of the monitor value is equal to or less than the first variation amount when in a case in which a ratio of a maximum value to a minimum value of the plurality of monitor values is equal to or less than a threshold value.

5. The digital coherent receiver according to claim 1, wherein the determination circuit determines that the variation amount of the monitor value is equal to the first variation amount when a state in which a disparity among a plurality of monitor values detected successively by the sensitivity monitor circuit is equal to or less than a threshold value continues for a period.

6. The digital coherent receiver according to claim 5, wherein the determination circuit determines that the variation amount of the monitor value is equal to the first variation amount when a state in which a difference among the plurality of monitor values is equal to or less than a threshold value continues for a period.

7. The digital coherent receiver according to claim 5, wherein the determination circuit determines that the variation amount of the monitor value is equal to or less than the first variation amount when a state in which a ratio among the plurality of monitor values is equal to or less than a threshold value continues for a period.

8. The digital coherent receiver according to claim 7, wherein the optical signals are polarization multiplexed signal light.

9. The digital coherent receiver according to claim 1, further comprising:
a converter configured to convert a reception optical signal to the optical signals that include intensity information and phase information.

10. An optical reception system, comprising:
an optical reception device configured to receive a reception optical signal transmitted from an optical transmission device, the optical reception device comprises:
a combining circuit configured to combine the reception optical signal and local oscillation light to obtain a plurality of optical signals that indicate intensity information and phase information:
a photoelectric converter, coupled to the combining circuit, configured to photoelectric convert the plurality of optical signals to a plurality of analog electrical signals:
an analog-digital converter, coupled to the photoelectric converter, configured to sample the plurality of analog electrical signals by using a sampling signal and digitally convert the plurality of analog electrical signals to a plurality of digital electrical signals;
a wavelength dispersion compensation circuit, coupled to the analog-digital converter, configured to compensate wavelength dispersion of the digital electrical signals;
a phase deviation detector, coupled to the wavelength dispersion compensation circuit, configured to output a detection value corresponding to a phase deviation between the sampling signal and the optical signals by using the digital electrical signals output from the wavelength dispersion compensation circuit;
a sensitivity monitor circuit, coupled to the wavelength dispersion compensation circuit, configured to monitor the digital electrical signals output from the wavelength dispersion compensation circuit; and
a determination circuit, coupled to the sensitivity monitor circuit, configured to determine whether or not a variation amount of monitor value output from the sensitivity monitor circuit is equal to or less than a first variation amount and
output, to the wavelength dispersion compensation circuit, a compensation amount for compensating wavelength dispersion of the digital electrical signals based on the monitor value when the variation amount has reached or fallen below the first variation amount.

11. The optical reception system receiver according to claim 10, wherein the determination circuit determines that the variation amount of the monitor value is equal to or less than the first variation amount when a difference between a maximum value and a minimum value of a plurality of monitor values detected by the sensitivity monitor circuit in a period of time is equal to or less than a threshold value.

12. The optical reception system receiver according to claim 10, wherein the determination circuit determines that the variation amount of the monitor value is equal to or less than the first variation amount when in a case in which a ratio of a maximum value to a minimum value of a plurality of monitor values detected by the sensitivity monitor circuit in a period of time is equal to or less than a threshold value.

13. The optical reception system receiver according to claim 10, wherein the determination circuit determines that the variation amount of the monitor value is equal to the first variation amount when a state in which a difference among a plurality of monitor values detected successively by the sensitivity monitor circuit is equal to or less than a threshold value continues for a period.

14. The optical reception system receiver according to claim 10, wherein the determination circuit determines that the variation amount of the monitor value is equal to or less than the first variation amount when a state in which a ratio among a plurality of monitor values detected successively by the sensitivity monitor circuit is equal to or less than a threshold value continues for a period.

15. An optical reception method, comprising:
converting a plurality of analog electrical signals to a plurality of digital electrical signals by sampling the plurality of analog electrical signals by using a sampling signal, the plurality of analog electrical signals being obtained by subjecting a plurality of optical signals to photoelectric conversion;
compensating, by a wavelength dispersion compensation circuit, wavelength dispersion of the digital electrical signals;
detecting, by a phase deviation detector coupled to the wavelength dispersion compensation circuit, a detection value corresponding to a phase deviation between the sampling signal and the optical signals by using the digital electrical signals output from the wavelength dispersion compensation circuit;
monitoring, by a sensitivity monitor circuit, coupled to the wavelength dispersion compensation circuit, the digital electrical signals output from the wavelength dispersion compensation circuit;
determining whether or not a variation amount of a monitor value output from the sensitivity monitor circuit is equal to or less than a first variation amount; and outputting, to the wavelength dispersion compensation circuit, a compensation amount for compensating wavelength dispersion of the digital electrical signals based on the monitor value when the variation amount is equal to or less than the first variation amount.

16. The optical reception method according to claim 11, wherein the plurality of optical signals that indicate the intensity information and the phase information are generated by combining a reception optical signal and local oscillation light.

17. The optical reception method according to claim 11, when the variation amount of the monitor value is equal to or less than the first variation amount when a difference between a maximum value and a minimum value of the plurality of monitor values detected by the sensitivity monitor circuit in a period of time is equal to or less than a threshold value.

18. The optical reception method according to claim 11, wherein the variation amount of the monitor value is equal to or less than the first variation amount when in a case in which a ratio of a maximum value to a minimum value of the plurality of monitor values detected by the sensitivity monitor circuit in a period of time is equal to or less than a threshold value.

19. The optical reception method according to claim 11, wherein the variation amount of the monitor value is equal to the first variation amount when a state in which a difference among the plurality of monitor values detected successively by the sensitivity monitor circuit is equal to or less than a threshold value continues for a period.

20. The optical reception method according to claim 11, wherein the variation amount of the monitor value is equal to or less than the first variation amount when a state in which a ratio among the plurality of monitor values detected successively by the sensitivity monitor circuit is equal to or less than a threshold value continues for a period.

* * * * *